(12) United States Patent
Fryer (10) Patent No.: US 12,535,034 B1
(45) Date of Patent: Jan. 27, 2026

(54) JOINT BETWEEN AIRCRAFT ENGINE COMPONENTS WITH SPRING BEAMS

(71) Applicant: Pratt & Whitney Canada Corp., Longueuil (CA)

(72) Inventor: Michael Fryer, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/899,850

(22) Filed: Sep. 27, 2024

(51) Int. Cl.
*F02C 6/08* (2006.01)
*F02C 7/04* (2006.01)
*F02C 9/18* (2006.01)

(52) U.S. Cl.
CPC ............... *F02C 6/08* (2013.01); *F02C 7/04* (2013.01); *F02C 9/18* (2013.01); *F05D 2220/323* (2013.01)

(58) Field of Classification Search
CPC ............ F02C 6/08; F02C 9/18; F01D 17/105
See application file for complete search history.

(56) References Cited

U.S. PATENT DOCUMENTS

| | | | |
|---|---|---|---|
| 4,406,580 A | 9/1983 | Baran, Jr. | |
| 5,718,512 A | 2/1998 | Ngo-Beelmann | |
| 6,843,061 B2 | 1/2005 | Parker | |
| 9,127,590 B2 * | 9/2015 | Schoenherr | ........... F02B 37/183 |
| 10,472,072 B2 | 11/2019 | Beers | |
| 10,605,157 B2 * | 3/2020 | Sadamitsu | ............ F01D 17/105 |
| 11,092,083 B2 | 8/2021 | Clark | |
| 2014/0013767 A1 | 1/2014 | Bohney | |
| 2020/0096331 A1 | 3/2020 | Warren | |
| 2020/0200387 A1 | 6/2020 | Hu | |
| 2021/0332710 A1 | 10/2021 | White, III | |
| 2023/0093292 A1 * | 3/2023 | Dobson | ..................... F02C 6/08 60/779 |

FOREIGN PATENT DOCUMENTS

DE 102018204251 A1 * 9/2019 ........... F01D 17/105

* cited by examiner

*Primary Examiner* — Justin D Seabe
(74) *Attorney, Agent, or Firm* — Getz Balich LLC (57) ABSTRACT

An assembly includes a case, a housing and a component. The case includes an aperture, an exterior side and an interior side. The aperture extends axially along an axis through the case from the exterior side to the interior side. The interior side forms a peripheral boundary of an internal volume of the aircraft engine. A cavity is formed by and extends axially between the housing and the case. The component includes a projection and a mount that is disposed within the cavity. The projection projects axially out from the mount, through the aperture, and into the internal volume to a distal end of the component. The mount includes a rim and a plurality of spring beams. The spring beams bias the rim axially towards the case to provide a sealed engagement axially between the mount and the case.

19 Claims, 11 Drawing Sheets

JOINT BETWEEN AIRCRAFT ENGINE COMPONENTS WITH SPRING BEAMS

TECHNICAL FIELD

This disclosure relates generally to an aircraft and, more particularly, to a joint between components of an aircraft engine.

BACKGROUND INFORMATION

Various types and configurations of joints between engine components are known in the art for aircraft engines. While these known joints have various benefits, there is still room in the art for improvement.

SUMMARY

According to an aspect of the present disclosure, an assembly is provided for an aircraft engine. This assembly includes a case, a housing and a component. The case includes an aperture, an exterior side and an interior side. The aperture extends axially along an axis through the case from the exterior side to the interior side. The interior side forms a peripheral boundary of an internal volume of the aircraft engine. The housing is attached to the case. A cavity is formed by and extends axially between the housing and the case. The component includes a projection and a mount that is disposed within the cavity. The projection projects axially out from the mount, through the aperture, and into the internal volume to a distal end of the component. The mount includes a rim and a plurality of spring beams. The rim circumscribes the axis. The spring beams are arranged circumferentially about the rim. Each of the spring beams is cantilevered from the rim, is axially spaced from the case and axially engages the housing such that the spring beams bias the rim axially towards the case to provide a sealed engagement axially between the mount and the case.

According to another aspect of the present disclosure, another assembly is provided for an aircraft engine. This assembly includes a case, a fitting for a fluid conduit, and a fluid intake. The case includes an aperture, a case exterior side and a case interior side. The aperture extends axially along an axis through the case from the case exterior side to the case interior side. The case interior side forms a peripheral boundary of an internal volume of the aircraft engine. The fitting is mechanically fastened to the case. A cavity is formed by and extends axially between the fitting and the case. The fluid intake includes a projection and a mount that is arranged in the cavity. The projection projects axially from the mount, through the aperture, and into the internal volume to an unsupported interior end of the fluid intake. The mount includes a rim, a first spring beam and a second spring beam. The rim circumscribes the axis and axially engages the case. The first spring beam and the second spring beam are arranged circumferentially about the rim and axially spaced from the case. The first spring beam projects radially out from the rim to a distal radial end of the first spring beam. The first spring beam includes a first standoff located at the distal radial end of the first spring beam. The first standoff is biased axially against the fitting. The second spring beam projects radially out from the rim to a distal radial end of the second spring beam. The second spring beam includes a second standoff located at the distal radial end of the second spring beam. The second standoff is biased axially against the fitting.

According to still another aspect of the present disclosure, another assembly is provided for an aircraft engine. This assembly includes an air intake which includes a projection, a mount, an air passage and an air inlet. The projection projects axially along an axis out from an interior side of the mount to a distal end of the air intake. The mount includes a rim, a first cantilevered spring beam and a second cantilevered spring beam. The rim extends circumferentially around the air passage and forms the interior side of the mount. The first cantilevered spring beam and the second cantilevered spring beam are arranged circumferentially about the rim and axially spaced from the interior side of the mount. The first cantilevered spring beam includes a first leaf spring and a first standoff that is located at a distal radial end of the first cantilevered spring beam. The first leaf spring projects radially out from the rim to the distal radial end of the first cantilevered spring beam. The first standoff projects axially out from the first leaf spring in an axial direction away from the distal end of the air intake to a distal axial end of the first standoff. The second cantilevered spring beam includes a second leaf spring and a second standoff that is located at a distal radial end of the second cantilevered spring beam. The second leaf spring projects radially out from the rim to the distal radial end of the second cantilevered spring beam. The second standoff projects axially out from the second leaf spring in the axial direction away from the distal end of the air intake to a distal axial end of the second standoff. The air passage projects axially into the air intake through the mount and into the projection. The air inlet is formed in a sidewall of the projection and fluidly couples the air passage to an environment outside of the air intake.

The rim may axially contact the case.

A first of the spring beams may axially contact the housing at a distal radial end of the first of the spring beams.

A first of the spring beams may include: a leaf spring projecting radially out from the rim to a distal radial end of the first of the spring beams; and a standoff at the distal radial end of the first of the spring beams, the standoff projecting axially out from the leaf spring to a distal axial end, and the standoff axially engaging the housing at the distal axial end.

An axial thickness of the rim may be greater than an axial thickness of the leaf spring.

An axial thickness of the rim may be equal to or less than an axial height of the standoff.

An axial height of the standoff may be equal to or greater than an axial thickness of the leaf spring.

A radial length of the leaf spring may be greater than an axial thickness of the leaf spring.

Each of the spring beams may have a common lateral width.

Each of the spring beams may have a common configuration.

A first of the spring beams may have a first lateral width. A second of the spring beams may have a second lateral width that is different than the first lateral width.

A first of the spring beams may have a first configuration. A second of the spring beams may have a second configuration that is different than the first configuration.

The spring beams may be equispaced circumferentially about the axis.

The spring beams may be asymmetrically spaced circumferentially about the axis.

The housing may include a housing, a passage, a counterbore and a plurality of slots. The housing interior side may axially engage the case. The counterbore may project axially into the case from the housing interior side to the passage. The rim may be received within the counterbore. The slots may be arranged circumferentially about the axis. Each of the slots may project radially within the housing out from the counterbore. Each of the slots may project axially into the case from the housing interior side. Each of the spring beams may be received within a respective one of the slots.

The housing may axially contact the case.

The assembly may also include a gasket axially between and contacting the housing and the case.

The assembly may also include a fluid conduit. The component may include a fluid intake that is fluidly coupled to the fluid conduit through the housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
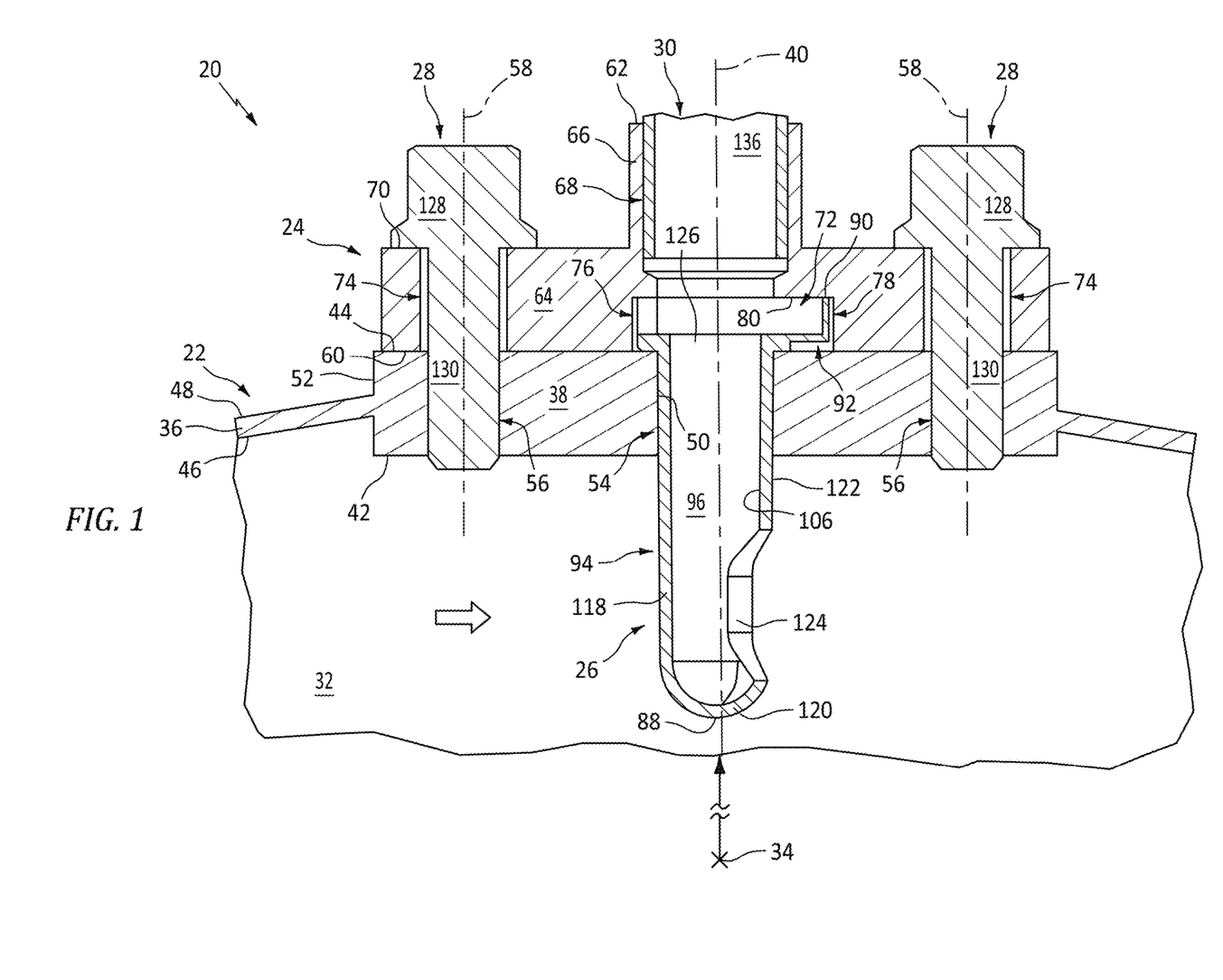
FIG. 1 is a partial cross-sectional illustration of an engine assembly.
Figure 2:
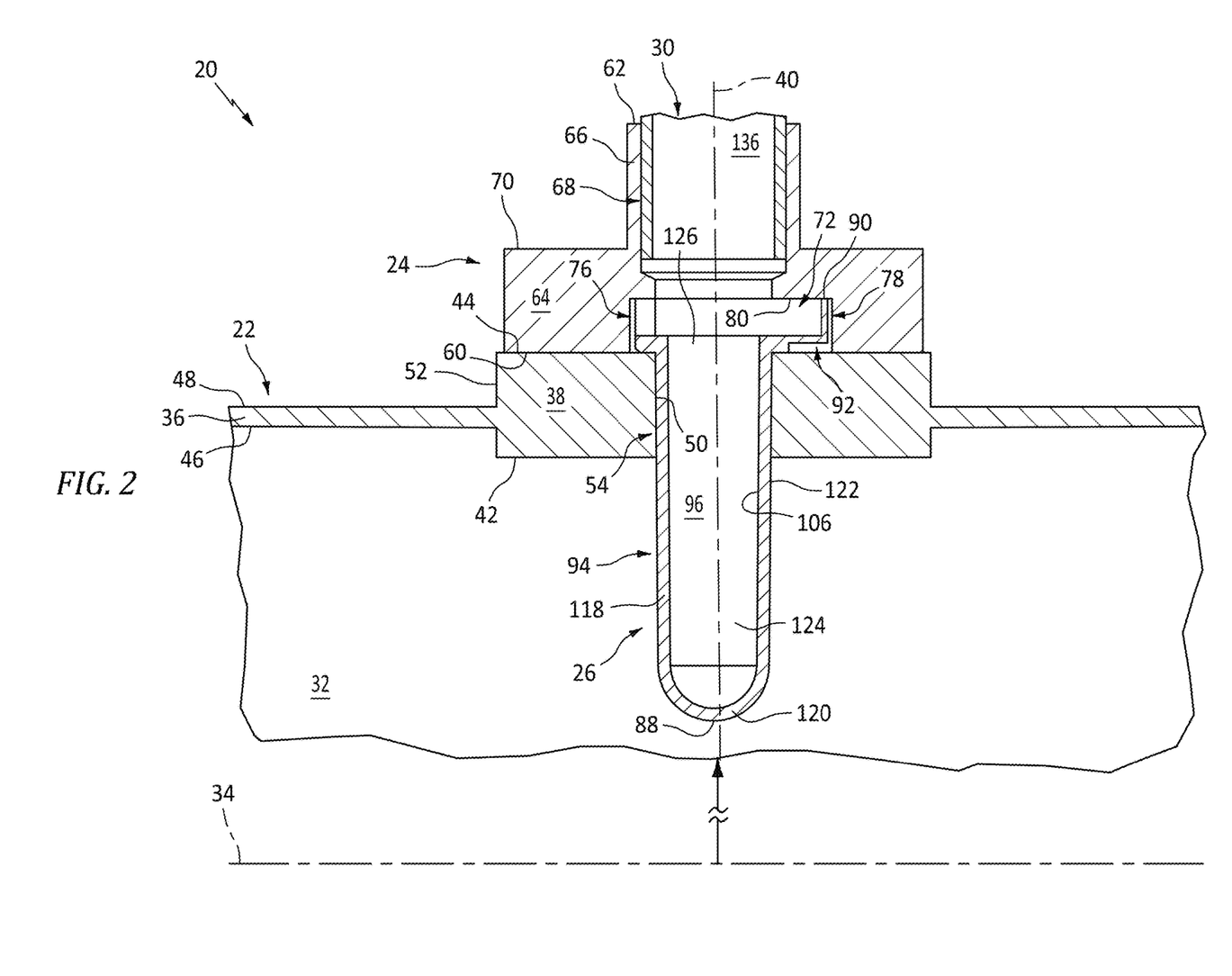
FIG. 2 is a partial side sectional illustration of the engine assembly.

FIGS. 1 and 2 illustrate an assembly 20 for an engine of an aircraft. The aircraft may be an airplane, a helicopter, a drone (e.g., an unmanned aerial vehicle (UAV)) or any other manned or unmanned aerial vehicle or system. The aircraft engine may be configured as, or otherwise included as part of, a propulsion system for the aircraft. The aircraft engine, for example, may be a turbofan engine, a turbojet engine, a turboprop engine, a turboshaft engine, or any other type of internal combustion engine configured to generate thrust and/or drive operation of an air mover; e.g., a ducted or open propulsor rotor. The aircraft engine may alternatively (or also) be configured as, or otherwise included as part of, a power generation system for the aircraft. The aircraft engine, for example, may be an auxiliary power unit (APU) or any other type of internal combustion engine configured to mechanically power operation of an electrical generator. The present disclosure, however, is not limited to such exemplary aircraft engines.

This engine assembly 20 includes an engine case 22, a component housing 24, an engine component 26 and one or more fasteners 28 (see FIG. 1); e.g., bolts. For ease of description, the engine component 26 is described below as a fluid intake for a fluid system of the aircraft engine. This fluid intake may be an air intake such as, but not limited to, an air snorkel and/or an air scoop. Also for ease of description, the component housing 24 is described below as a fluid fitting (e.g., an adaptor) for a fluid conduit 30 (e.g., an air conduit, a bleed conduit, etc.) of the fluid system. The present disclosure, however, is not limited to such an exemplary arrangement. The engine component 26, for example, may alternatively be configured as a sensor or any other device which, for example, may be installed from an exterior of the engine case 22 and/or may project into an internal volume 32 within the aircraft engine and its engine case 22.

The engine case 22 of FIG. 2 extends longitudinally along a longitudinal centerline 34 of the engine assembly 20 and its engine case 22, which longitudinal centerline 34 may be coaxial with (or otherwise parallel with) a rotational axis of the aircraft engine. The engine case 22 of FIG. 1 extends circumferentially about (e.g., completely around) the longitudinal centerline 34 providing the engine case 22 with, for example, a full-hoop body. The engine case 22 of FIG. 1 includes a case sidewall 36 and a case mount 38; e.g., a mounting boss.

The case mount 38 of FIGS. 1 and 2 extends axially along a centerline axis 40 (e.g., radially relative to the longitudinal centerline 34) between and to an axial interior side 42 of the case mount 38 and an axial exterior side 44 of the case mount 38. Briefly, the centerline axis 40 may be a centerline axis of any one or more or all of the engine assembly members 24, 26, 30 and/or 38. The mount interior side 42 may be axially offset from an axial interior side 46 of the case sidewall 36 where, for example, the case mount 38 projects axially along the centerline axis 40 out from the case sidewall 36 (e.g., radially towards the longitudinal centerline 34) to the mount interior side 42. The mount exterior side 44 may be axially offset from an axial exterior side 48 of the case sidewall 36 where, for example, the case mount 38 projects axially along the centerline axis 40 out from the case sidewall 36 (e.g., radially away from the longitudinal centerline 34) to the mount exterior side 44. The case mount 38 extends radially relative to the centerline axis 40 (e.g., axially along and/or circumferentially about the longitudinal centerline 34) between and to a radial inner side 50 of the case mount 38 and a radial outer side 52 of the case mount 38. The case mount 38 of FIG. 1 includes a mount aperture 54 and one or more mount fastener apertures 56.

The mount aperture 54 of FIG. 1 is formed by a (e.g., cylindrical) inner surface of the case mount 38 at the mount inner side 50. This mount aperture 54 extends axially along the centerline axis 40 through the engine case 22 and its case mount 38 between and to the mount interior side 42 and the mount exterior side 44. The mount aperture 54 may have a circular cross-sectional geometry when viewed, for example, in a reference plane perpendicular to the centerline axis 40. The present disclosure, however, is not limited to such an exemplary mount aperture cross-sectional geometry.

The mount fastener apertures 56 of FIG. 1 are arranged circumferentially about the longitudinal centerline 34 to opposing sides of the mount aperture 54. Each of the mount fastener apertures 56 extends axially along a respective fastener axis 58 through (or into) the case mount 38, where the fastener axis 58 may be parallel to the centerline axis 40. Each mount fastener aperture 56 of FIG. 1, for example, extends axially through the case mount 38 between and to the mount interior side 42 and the mount exterior side 44. Each mount fastener aperture 56 may be configured as a threaded hole in the case mount 38.

Referring to FIGS. 1 and 2, the component housing 24 extends axially along the centerline axis 40 between and to an axial interior side 60 of the component housing 24 and an axial exterior side 62 of the component housing 24. The component housing 24 of FIGS. 1 and 2 includes a housing base 64, a housing protrusion 66 and a housing passage 68.

Figure 3:
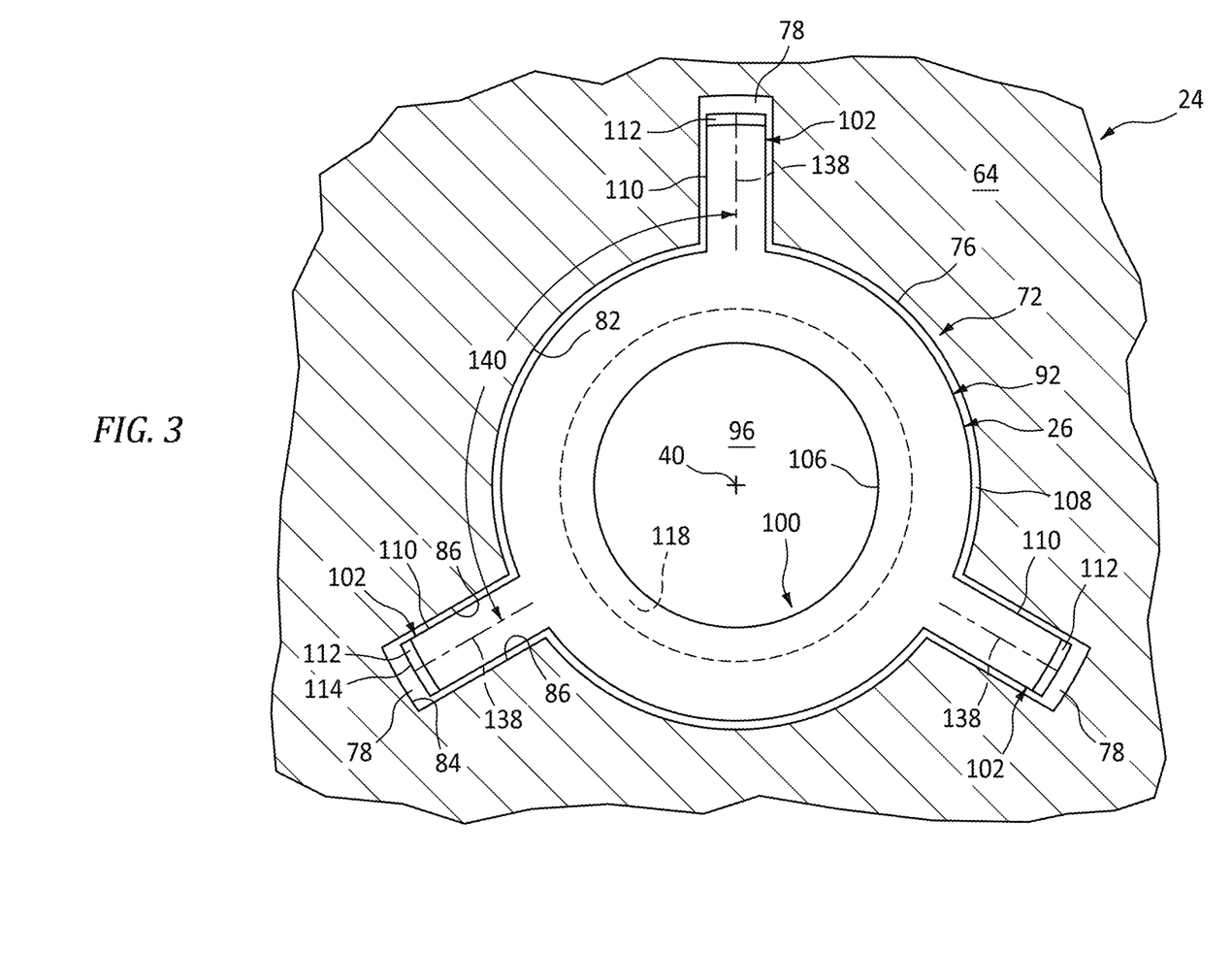
FIG. 3 is a side view sectional illustration of a portion of the engine assembly.

The housing base 64 is disposed axially at the housing interior side 60. The housing base 64 of FIGS. 1 and 2, for example, extends axially along the centerline axis 40 between and to the housing interior side 60 and an axial exterior side 70 of the housing base 64. The housing base 64 includes an internal housing cavity 72 and one or more housing fastener apertures 74. Referring to FIG. 3, the housing cavity 72 includes and is collectively formed by at least (or only) a counterbore 76 and one or more slots 78.

The counterbore 76 of FIG. 3 is coaxial with the centerline axis 40. Referring to FIG. 1, the counterbore 76 projects axially along the centerline axis 40 partially into the component housing 24 and its housing base 64 from the housing interior side 60 to a distal axial end 80 of the housing cavity 72/an axial end of the housing passage 68. Referring to FIG. 3, the counterbore 76 extends radially within the component housing 24 and its housing base 64 from the centerline axis 40 to a radial outer perimeter 82 of the counterbore 76. The counterbore 76 extends within the component housing 24 and its housing base 64 circumferentially about (e.g., completely around) the centerline axis 40.

The slots 78 are arranged circumferentially about the centerline axis 40 in an array. Referring to FIG. 1, each of these slots 78 projects axially along the centerline axis 40 partially into the component housing 24 and its housing base 64 from the housing interior side 60 to the cavity axial end 80. Referring to FIG. 3, each of the slots 78 extends radially within the component housing 24 and its housing base 64 from the counterbore 76 to a distal radial end 84 of the respective slot 78. Each of the slots 78 extends laterally (e.g., circumferentially or tangentially) within the component housing 24 and its housing base 64 between opposing lateral sides 86 of the respective slot 78.

The housing fastener apertures 74 of FIG. 1 are arranged circumferentially about the longitudinal centerline 34 to opposing sides of the housing cavity 72 and the housing passage 68. Each of the housing fastener apertures 74 extends axially along the respective fastener axis 58 through the housing base 64. Each housing fastener aperture 74 of FIG. 1, for example, extends axially through the housing base 64 between and to the housing interior side 60 and the housing base exterior side 70. Each housing fastener aperture 74 may be configured as an unthreaded through-hole in the housing base 64.

The housing protrusion 66 is connected to (e.g., formed integral with or otherwise attached to) the housing base 64. The housing protrusion 66 is disposed axially at the housing exterior side 62. The housing protrusion 66 of FIG. 1, for example, projects axially along the centerline axis 40 out from the housing base 64 at its housing base exterior side 70 to the housing exterior side 62.

The housing passage 68 extends axially along the centerline axis 40 into the component housing 24 from the housing exterior side 62 to the housing cavity 72. More particularly, the housing passage 68 extends axially from the housing exterior side 62, through the housing protrusion 66 and into the housing base 64 to the cavity axial end 80. The housing passage 68 is thereby fluidly coupled with the housing cavity 72.

Figure 4:
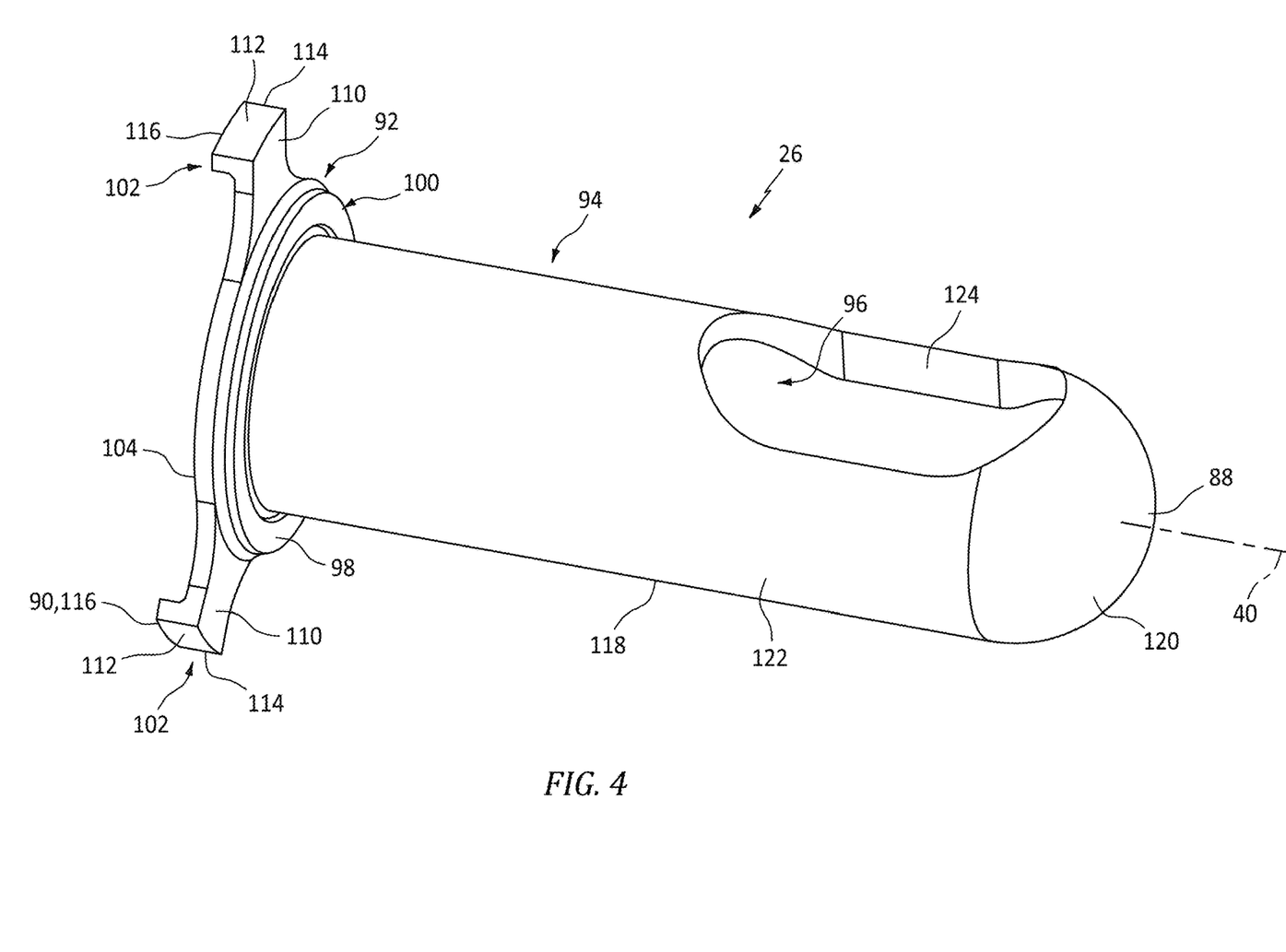
FIG. 4 is a perspective illustration of an engine component.
Figure 5:
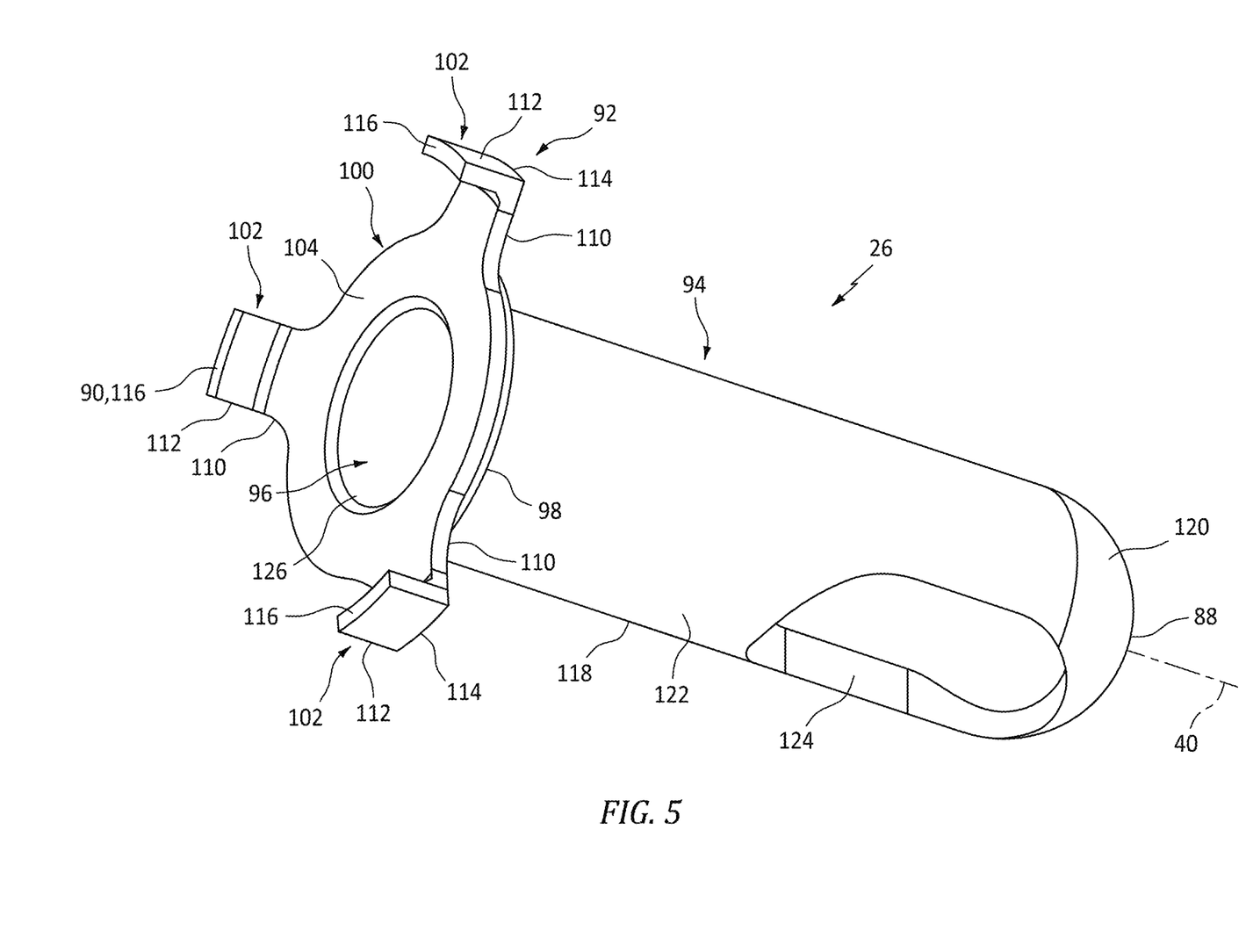
FIG. 5 is another perspective illustration of the engine component.

Referring to FIGS. 4 and 5, the engine component 26 extends axially along the centerline axis 40 between and to an axial interior end 88 of the engine component 26 and an axial exterior end 90 of the engine component 26. The engine component 26 includes a component base 92, a component protrusion 94 and a component passage 96.

The component base 92 is disposed at the component exterior end 90. The component base 92 of FIG. 4, for example, extends axially along the centerline axis 40 from the component exterior end 90 to an axial interior end 98 of the component base 92. The component base 92 of FIGS. 4 and 5 includes a component rim 100 and one or more component spring beams 102; e.g., cantilevered spring beams.

Figure 6:
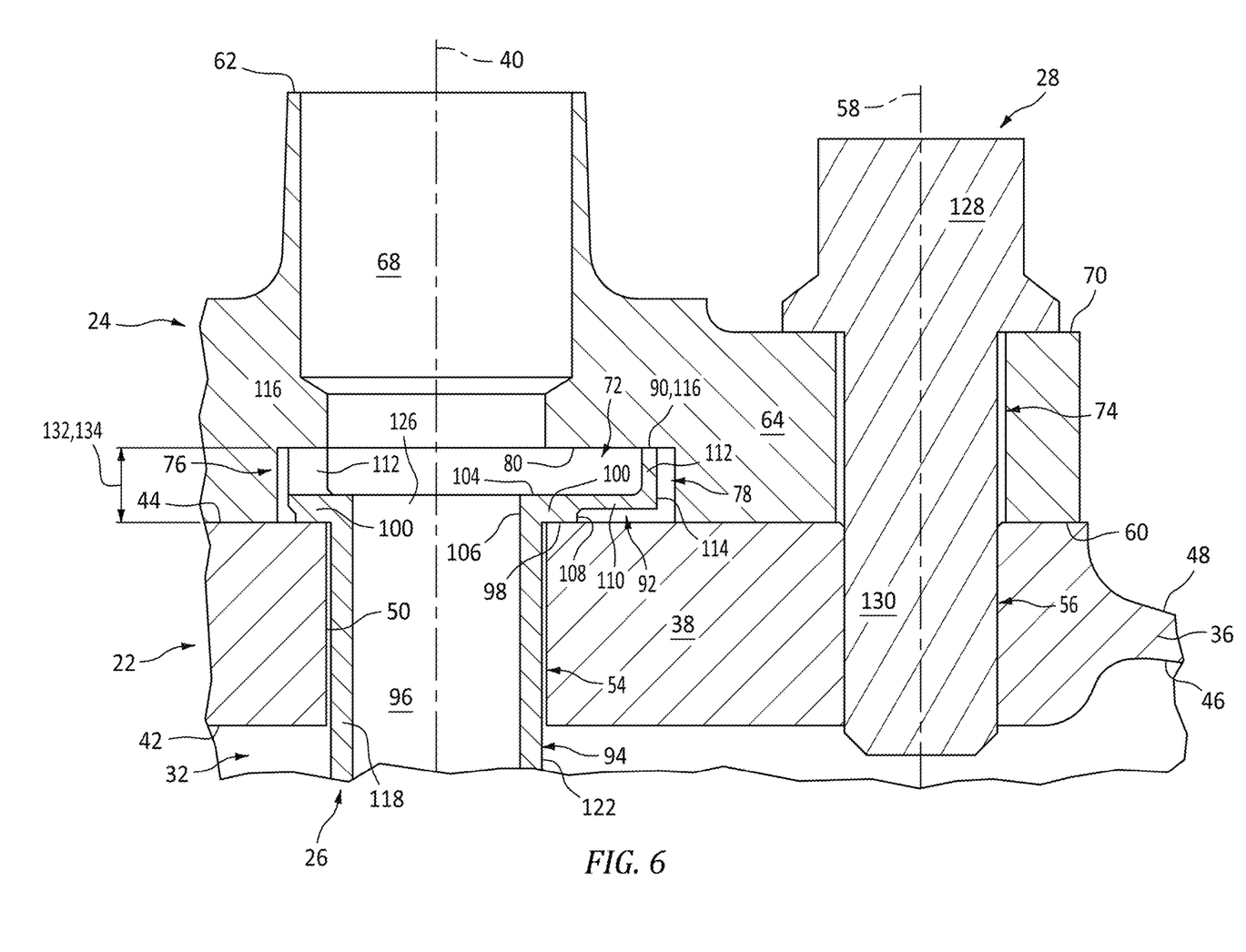
FIG. 6 is another cross-sectional illustration of the engine assembly.

Referring to FIG. 6, the component rim 100 extends axially along the centerline axis 40 between and to the component base interior end 98 and an axial exterior end 104 of the component rim 100. The component rim 100 extends radially from a radial inner side 106 of the engine component 26 to a radial outer side 108 of the component rim 100. The component rim 100 extends circumferentially about (e.g., completely around) the centerline axis 40 and the component passage 96.

Referring to FIGS. 4 and 5, the component spring beams 102 are arranged circumferentially about the centerline axis 40 and the component rim 100 in an array. Referring to FIG. 6, each of the component spring beams 102 includes a cantilevered leaf spring 110 and a spring standoff 112. The leaf spring 110 is connected to (e.g., formed integral with or otherwise attached to) the component rim 100 at the rim exterior end 104. The leaf spring 110 projects radially out from the component rim 100 at its rim outer side 108 to a distal radial end 114 of the respective component spring beam 102. The spring standoff 112 is connected to (e.g., formed integral with or otherwise attached to) the leaf spring 110 at the beam radial end 114. The spring standoff 112 projects axially out from the leaf spring 110 to a distal axial end 116 of the spring standoff 112, which standoff axial end 116 of FIG. 6 is also the component exterior end 90.

The component protrusion 94 is connected to (e.g., formed integral with or otherwise attached to) the component base 92 and its component rim 100. The component protrusion 94 of FIG. 4, for example, projects axially along the centerline axis 40 out from the component rim 100 at the component base interior end 98 to the component interior end 88; here a distal radial end of the component protrusion 94 and, more generally, the engine component 26. Referring to FIG. 1, the component protrusion 94 includes a tubular protrusion sidewall 118 and a protrusion endwall 120. The protrusion sidewall 118 extends axially along the centerline axis 40 between and to the component rim 100 and the protrusion endwall 120. The protrusion sidewall 118 extends radially relative to the centerline axis 40 from the component inner side 106 to a radial outer side 122 of the component protrusion 94. The protrusion endwall 120 closes an internal bore of the protrusion sidewall 118 at the component interior end 88. The protrusion endwall 120 of FIG. 4 is substantially hemispherical. The present disclosure, however, is not limited to such an exemplary endwall geometry.

The component passage 96 of FIG. 1 extends (e.g., generally axially along the centerline axis 40) within the engine component 26 from an inlet 124 into the component passage 96 to an outlet 126 from the component passage 96.

The passage inlet 124 is disposed at (e.g., on, adjacent or proximate) the component interior end 88. The passage inlet 124 of FIG. 1, for example, is formed by an orifice through the protrusion sidewall 118. The passage outlet 126 is disposed at the component exterior end 90. The passage outlet 126 of FIG. 1, for example, is formed by an orifice in the component base 92 and its component rim 100.

Referring to FIG. 6, the engine component 26 is mated with the engine case 22. The component base 92 of FIG. 6, for example, is arranged with the case mount 38 where the component base interior end 98 axially contacts or otherwise engages the mount exterior side 44. The component protrusion 94 is received by the mount aperture 54. The component protrusion 94 of FIG. 6, for example, projects axially through the mount aperture 54 and into the internal volume 32 (e.g., a cavity, a plenum, etc.) within the aircraft engine and its engine case 22. In FIG. 1, the mount interior side 42 and the sidewall interior side 46 and, thus more generally, an axial interior side of the engine case 22 form a peripheral boundary of the internal volume 32.

Referring to FIG. 6, the component housing 24 is mated with the engine case 22 and the engine component 26. The housing base 64 of FIG. 6, for example, is arranged with the case mount 38 where the housing interior side 60 axially contacts or otherwise engages the mount exterior side 44. The component base 92 and its component rim 100 and its component spring beams 102 are arranged within the housing cavity 72. The component rim 100 of FIG. 3, for example, is disposed within the counterbore 76. Each of the component spring beams 102 is disposed within a respective one of the slots 78. As shown in FIG. 3, a radial outer perimeter geometry of the component base 92 may closely match (e.g., may be substantially the same as, but slightly smaller than) a radial outer perimeter geometry of the housing cavity 72 in both shape and size. With such an arrangement, the engine component 26 may be substantially or completely rotationally fixed relative to the component housing 24 once the component base 92 is received within the housing cavity 72.

Referring to FIG. 6, each fastener 28 is mated with a respective set of the fastener apertures 56 and 74. More particularly, each fastener 28 includes a head 128 and a threaded shank 130 connected to the head 128. The head 128 is abutted axially against the housing base 64 at its housing base exterior side 70. The shank 130 projects axially out from the head 128 through a respective one of the housing fastener apertures 74 and is threaded into a respective one of the mount fastener apertures 56. The fasteners 28 thereby mechanically attach the component housing 24 to the engine case 22 with the component base 92 captured axially between the engine case 22 and the component housing 24 within the housing cavity 72.

Prior to mating the engine component 26 with the component housing 24, an axial distance 132 from the component base interior end 98 to the component exterior end 90 is sized greater than an axial depth 134 of the housing cavity 72 from the housing interior side 60 to the cavity axial end 80. Thus, after mating the engine component 26 with the component housing 24, the component spring beams 102 are axially biased (e.g., elastically deflected, bent and/or otherwise bowed) towards the engine case 22. In this axial biased arrangement, each spring standoff 112 axially contacts or otherwise engages the component housing 24 at the cavity axial end 80. Each spring standoff 112 is also biased axially against the component housing 24 and its cavity axial end 80 due to elastic flexure of the respective leaf spring 110 axially towards the engine case 22. In turn, the deflected component spring beams 102 axially bias the component rim 100 against the engine case 22. The component spring beams 102 may thereby facilitate provision of an axial sealed engagement between the component rim 100 and the engine case 22. Moreover, the component spring beams 102 also axially load the component rim 100 against the engine case 22 to facilitate a substantially or completely fixed mounting of the engine component 26 to the engine case 22. This may reduce or prevent movement (e.g., wobbling, shaking, oscillation, etc.) of the engine component 26 relative to the engine case 22 during aircraft engine operation. In addition, including the component spring beams 102 may accommodate larger manufacturing tolerances while still providing a sealed and clamped arrangement as described above. Note, in the axially biased arrangement of FIG. 6, each leaf spring 110 is (e.g., completely) axially spaced from both the engine case 22 and the component housing 24. The component rim 100 is also axially spaced from the component housing 24 and its cavity axial end 80.

Referring to FIG. 1, the fluid conduit 30 is attached to the component housing 24. The fluid conduit 30 of FIG. 1, for example, projects axially along the centerline axis 40 into the housing passage 68. The component housing 24 and its housing passage 68 may thereby fluidly couple the engine component 26 and its component passage 96 to the fluid conduit 30 and an internal passage 136 within the fluid conduit 30.

In some embodiments, the engine component 26 may be positioned within the internal volume 32 such that the passage inlet 124 is downstream relative to fluid (e.g., gas, compressed air) flowing within the internal volume 32. With such an arrangement, the fluid entering the component passage 96 through the passage inlet 124 is less likely to carry debris such as, but not limited to, sand, dirt and/or other particulates. Of course, in other embodiments, the engine component 26 may be alternatively positioned relative to the fluid flow within the internal volume 32.

Figure 7:
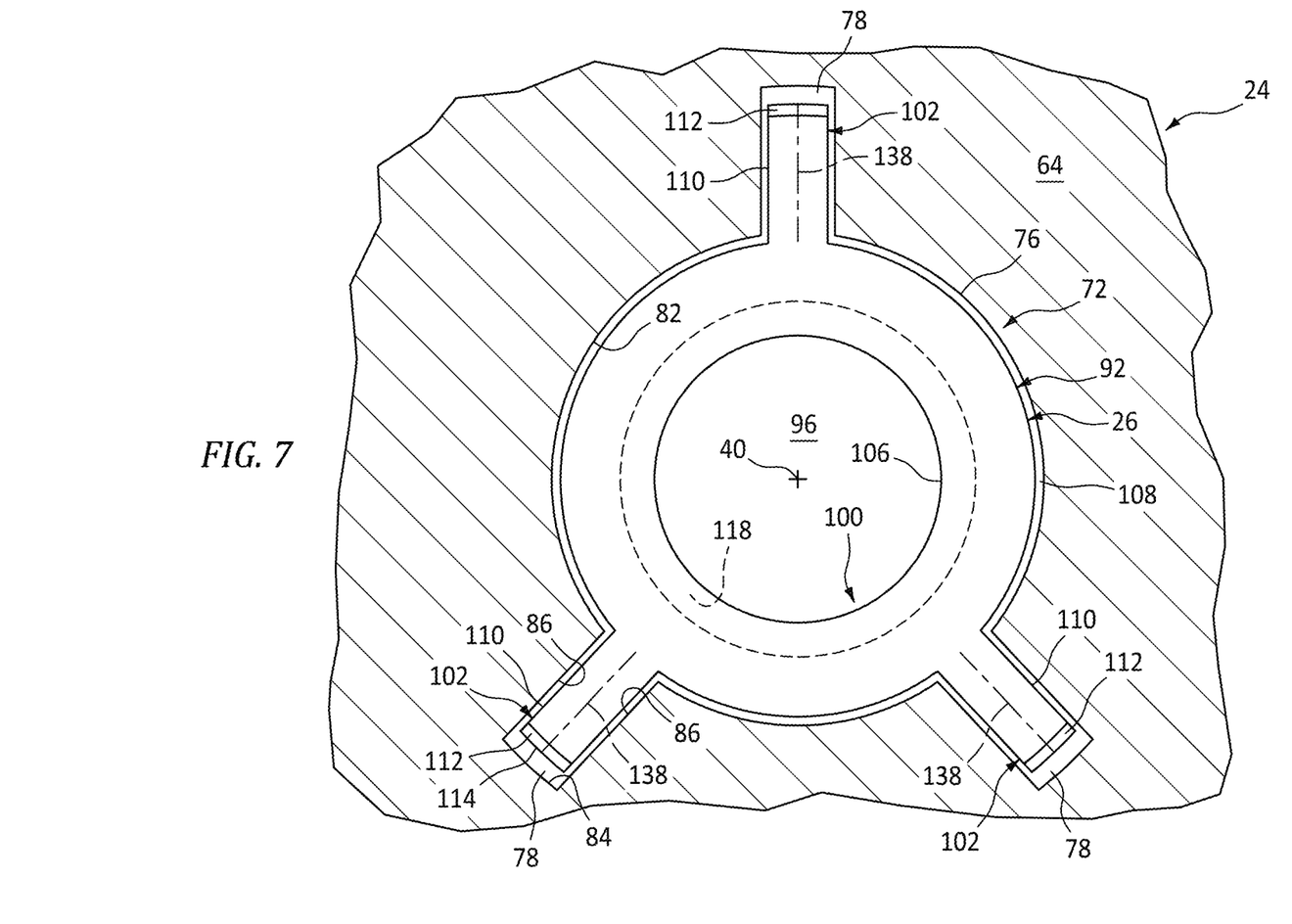
FIG. 7 is a side view sectional illustration of a portion of the engine assembly with an asymmetric spring beam arrangement.

In some embodiments, referring to FIG. 3, the component spring beams 102 may be equispaced circumferentially about the centerline axis 40. For example, where the engine component 26 and its component base 92 includes three (3) of the component spring beams 102, centerlines 138 of circumferentially neighboring component spring beams 102 may be spaced apart by an angle 140 of one-hundred and twenty degrees (120°). In other embodiments, referring to FIG. 7, the component spring beams 102 may be asymmetrically arranged circumferentially about the centerline axis 40. Such an arrangement may facilitate a mistake proof assembly process where, for example, the engine component 26 and its passage inlet 124 (see FIGS. 4 and 5) are to be clocked to a select position about the centerline axis 40.

Figure 8:
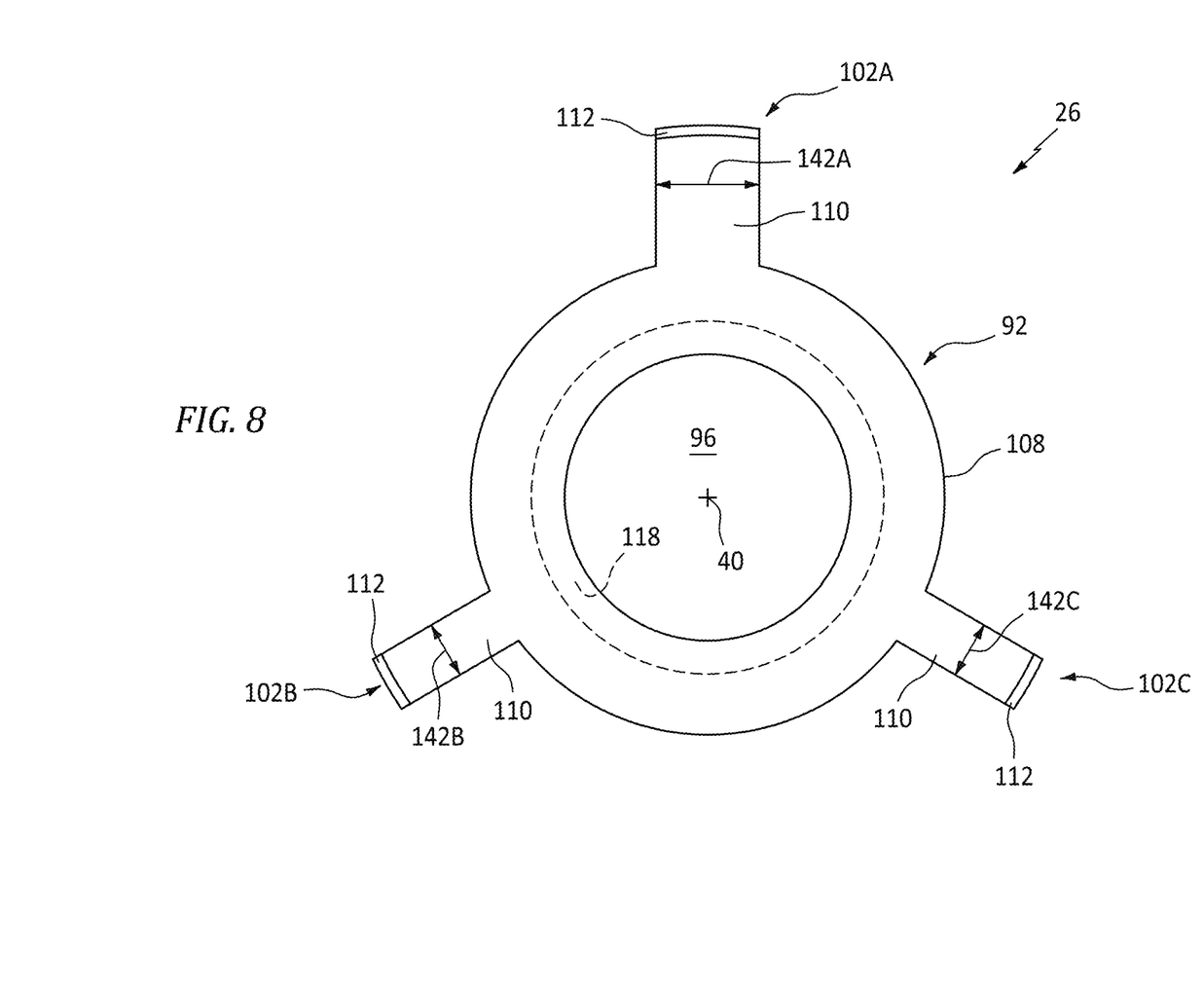
FIG. 8 is an end view illustration of the engine component with another spring beam arrangement.

In some embodiments, referring to FIGS. 3-5 and 7, each of the component spring beams 102 may have a common configuration; e.g., an identical configuration. Each of the component spring beams 102, for example, may share a common geometry (e.g., shape). Each of the component spring beams 102 may also share common dimensions; e.g., widths, lengths, thicknesses, etc. In other embodiments, referring to FIG. 8, at least one of the component spring beams 102 may have a different configuration than another one of the component spring beams 102. The first component spring beam 102A of FIG. 8, for example, has a wider lateral width 142A than the lateral width 142B of the second component spring beam 102C and a lateral width 142C of the third component spring beam 102C. Such an arrangement may also facilitate a mistake proof assembly process where, for example, the engine component 26 and its passage inlet 124 (see FIGS. 4 and 5) are to be clocked to a select position about the centerline axis 40.

Figure 9:
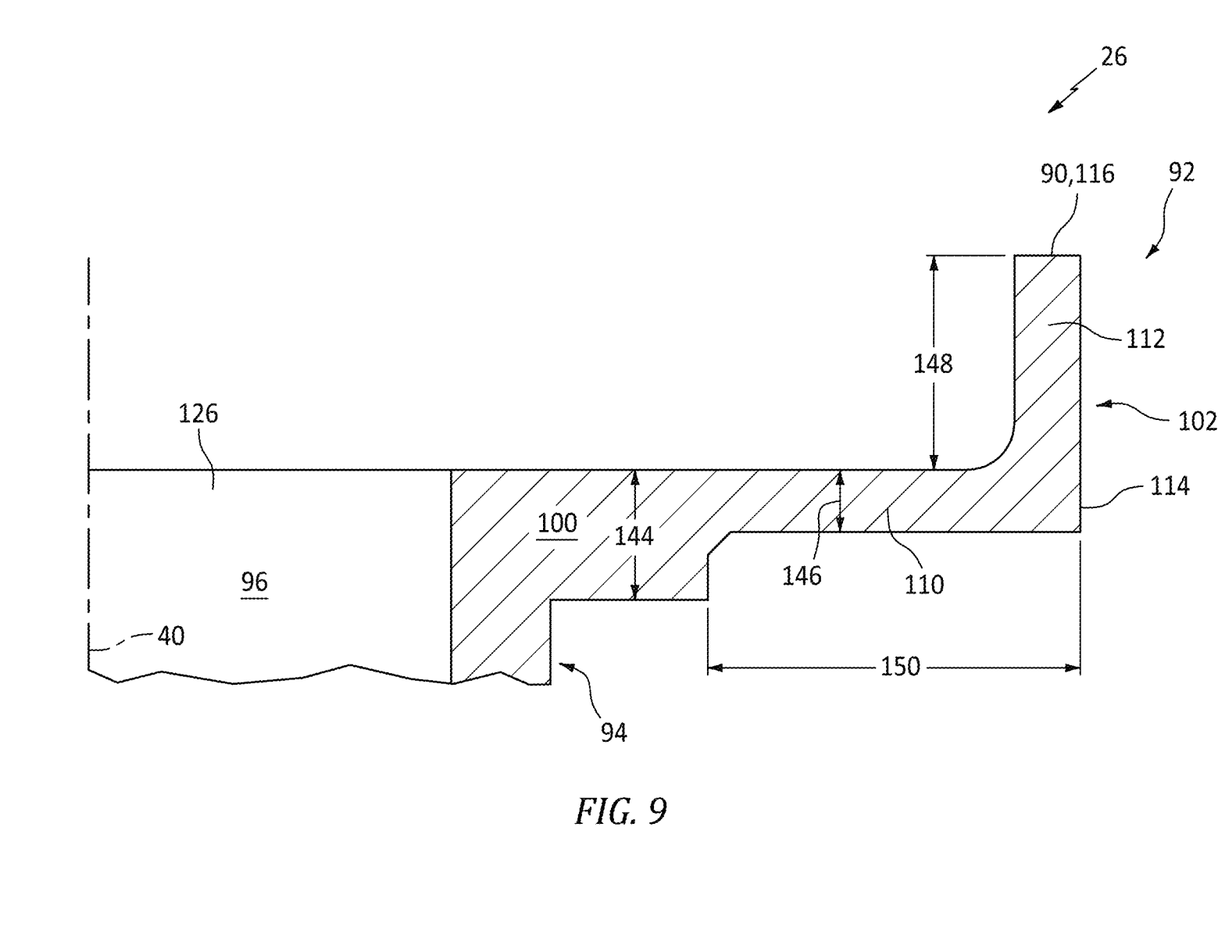
FIG. 9 is a partial sectional illustration of an end portion of the engine component.

Referring to FIG. 9, each component spring beam 102 may be configured to provide the component rim 100 with a certain clamping force against the engine case 22 (see FIG. 6). In the specific arrangement of FIG. 9, an axial thickness 144 of the component rim 100 is sized larger than an axial thickness 146 each leaf spring 110. The rim thickness 144 may also be sized equal to or smaller than an axial height 148 of each spring standoff 112. The standoff height 148 may be sized equal to or greater than the respective spring thickness 146. A radial length 150 of each leaf spring 110 may be sized greater than the respective spring thickness 146. The present disclosure, however, is not limited to such exemplary dimensional relationships as one or more of these dimensional relationships may be changed to tune the clamping force and/or spring rates of the respective component spring beam 102.

Figure 10:
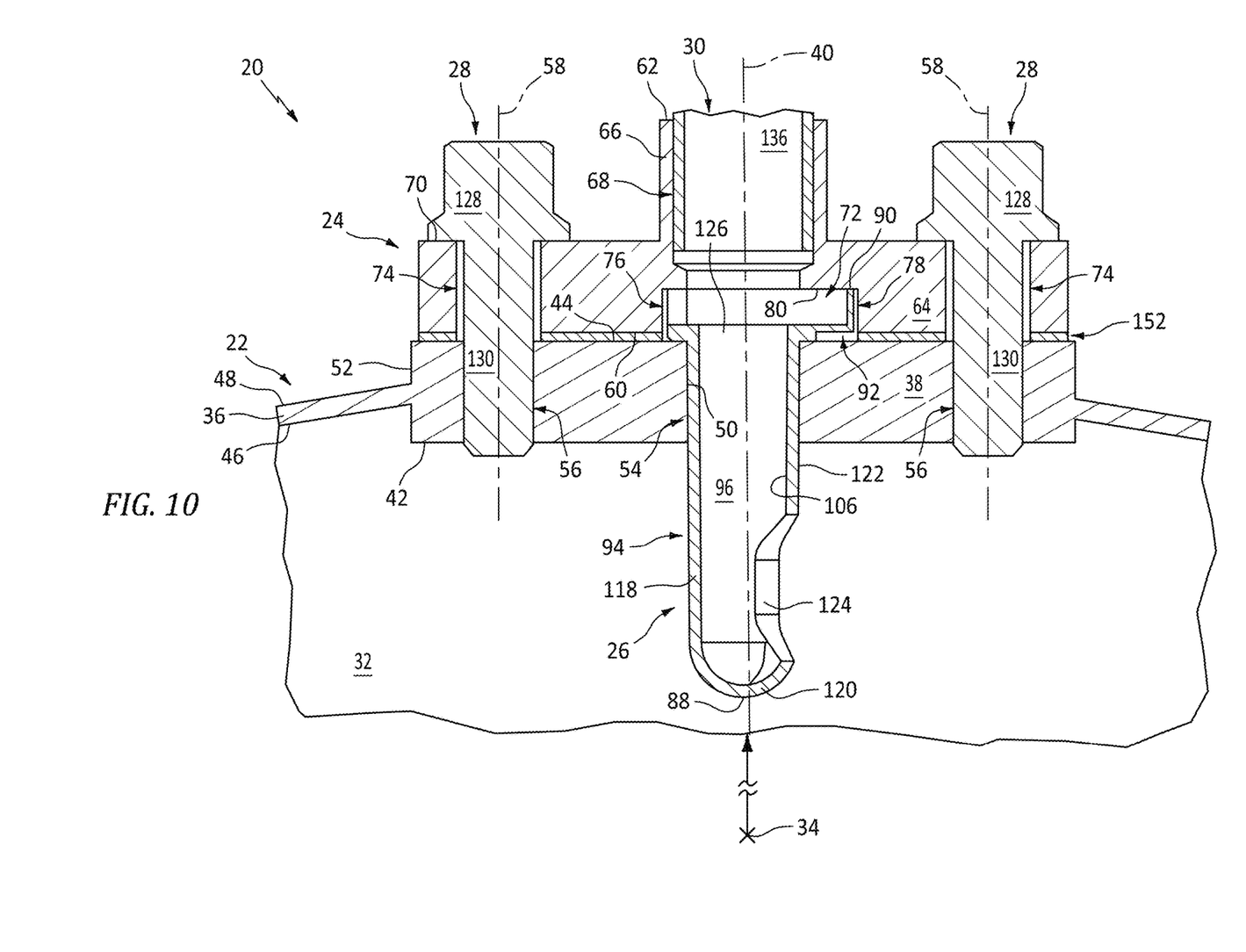
FIG. 10 is a partial cross-sectional illustration of the engine assembly with a gasket.

In some embodiments, referring to FIG. 10, a gasket 152 may be arranged axially between the engine case 22 and its case mount 38 and the component housing 24 and its housing base 64. This gasket 152 axially engages or otherwise engages the case mount 38 and the housing base 64.

Figure 11:
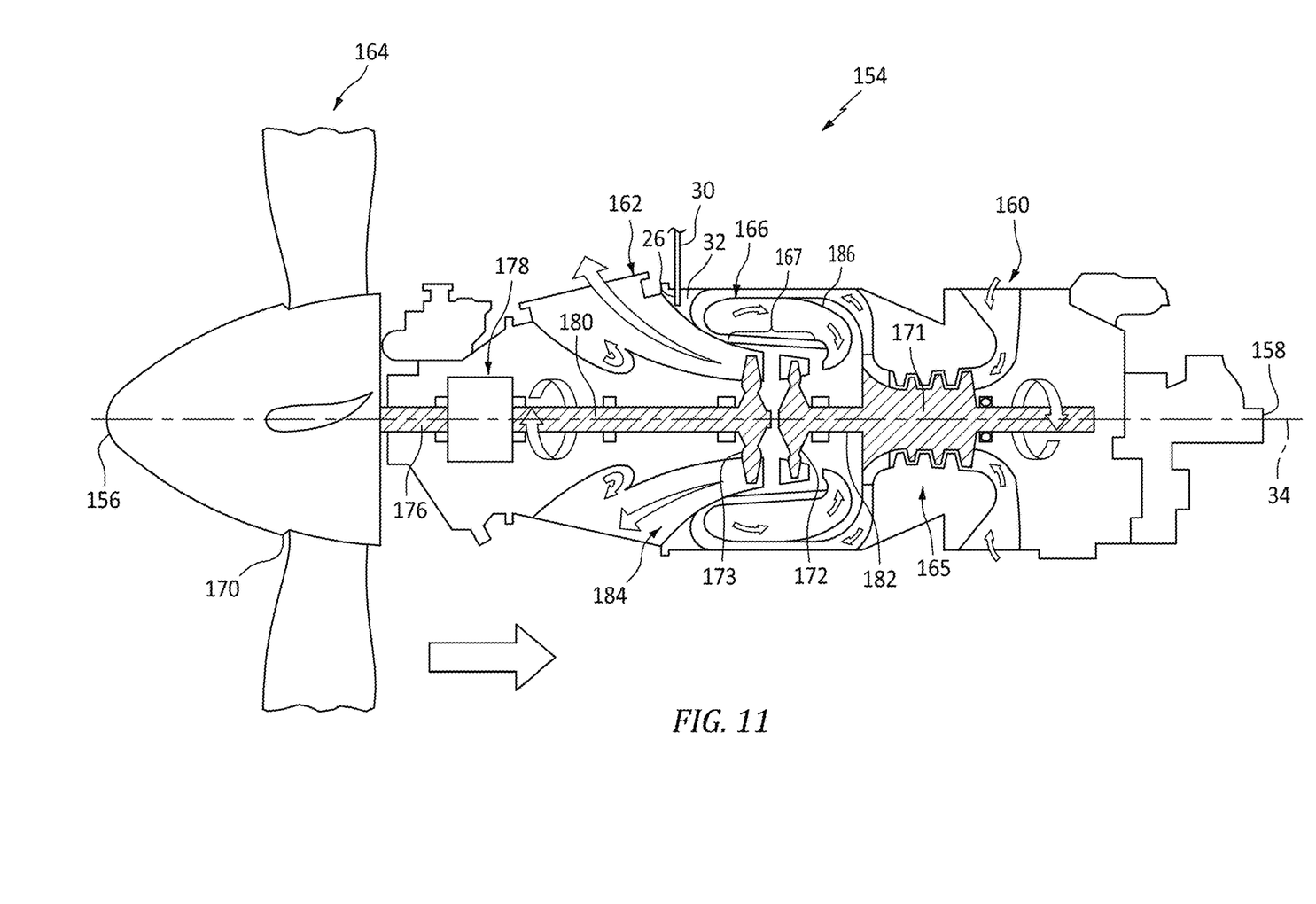
FIG. 11 is a side schematic illustration of a turboprop gas turbine engine.

FIG. 11 illustrates an example of the aircraft engine with which the engine assembly 20 described above may be included. This aircraft engine of FIG. 11 is configured as a turboprop gas turbine engine 154. The gas turbine engine 154 of FIG. 11 extends longitudinally along the longitudinal centerline 34 between a forward end 156 of the gas turbine engine 154 and an aft end 158 of the gas turbine engine 154. The gas turbine engine 154 of FIG. 11 includes an airflow inlet 160, a combustion products exhaust 162, a propulsor (e.g., a propeller) section 164, a compressor section 165, a combustion section 166 and a turbine section 167.

The airflow inlet 160 is located towards the engine aft end 158, and aft of the engine sections 164-167. The combustion products exhaust 162 is located towards the engine forward end 156, and axially between the propulsor section 164 and the engine sections 165-167.

The propulsor section 164 includes a bladed propulsor rotor 170; e.g., a propeller. The compressor section 165 includes a bladed compressor rotor 171. The turbine section 167 includes a bladed high pressure turbine (HPT) rotor 172 and a bladed low pressure turbine (LPT) rotor 173, where the LPT rotor 173 may be referred to as a power turbine (PT) rotor. Each of these bladed rotors 170-173 includes a plurality of rotor blades arranged circumferentially about and connected to one or more respective rotor disks or hubs.

The propulsor rotor 170 of FIG. 11 is connected to the LPT rotor 173 sequentially through a propulsor shaft 176, a geartrain 178 (e.g., a transmission) and a low speed shaft 180. The compressor rotor 171 is connected to the HPT rotor 172 through a high speed shaft 182.

During turbine engine operation, air enters the gas turbine engine 154 through the airflow inlet 160. This air is directed into a core flowpath 184 which extends sequentially from the airflow inlet 160, through the engine sections 165-167 (e.g., an engine core), to the combustion products exhaust 162. The air within this core flowpath 184 may be referred to as "core air". This core flowpath 184 may include the internal volume 32 of FIG. 1; e.g., the internal volume 32 may be a combustor plenum surrounding a combustor 186 within the combustion section 166.

The core air is compressed by the compressor rotor 171 and directed into a combustion chamber of the combustor 186. Fuel is injected into the combustion chamber and mixed with the compressed core air to provide a fuel-air mixture. This fuel-air mixture is ignited and combustion products thereof flow through and sequentially drive rotation of the HPT rotor 172 and the LPT rotor 173. The rotation of the HPT rotor 172 drives rotation of the compressor rotor 171 and, thus, compression of air received from the airflow inlet 160. The rotation of the LPT rotor 173 drives rotation of the propulsor rotor 170. This rotation of the propulsor rotor 170 propels air outside of the gas turbine engine 154 in an aft direction to provide forward aircraft thrust.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft engine, comprising:
a case including an aperture, an exterior side and an interior side, the aperture extending axially along an axis through the case from the exterior side to the interior side, and the interior side forming a peripheral boundary of an internal volume of the aircraft engine;
a housing attached to the case, and a cavity formed by and extending axially between the housing and the case; and
a component including a projection and a mount that is disposed within the cavity;
the projection projecting axially out from the mount, through the aperture, and into the internal volume to a distal end of the component;
the mount including a rim and a plurality of spring beams, the rim circumscribing the axis, the plurality of spring beams arranged circumferentially about the rim, each of the plurality of spring beams cantilevered from the rim, axially spaced from the case and axially engaging the housing such that the plurality of spring beams bias the rim axially towards the case to provide a sealed engagement axially between the mount and the case; and
the housing including
a housing interior side axially engaging the case;
a passage;
a counterbore projecting axially into the case from the housing interior side to the passage, wherein the rim is received within the counterbore; and
a plurality of slots arranged circumferentially about the axis, each of the plurality of slots projecting radially within the housing out from the counterbore, and each of the plurality of slots projecting axially into the case from the housing interior side, wherein each of the plurality of spring beams is received within a respective one of the plurality of slots.

2. The assembly of claim 1, wherein the rim axially contacts the case.

3. The assembly of claim 1, wherein a first of the plurality of spring beams axially contacts the housing at a distal radial end of the first of the plurality of spring beams.

4. The assembly of claim 1, wherein a first of the plurality of spring beams includes:

a leaf spring projecting radially out from the rim to a distal radial end of the first of the plurality of spring beams; and a standoff at the distal radial end of the first of the plurality of spring beams, the standoff projecting axially out from the leaf spring to a distal axial end, and the standoff axially engaging the housing at the distal axial end.

5. The assembly of claim 4, wherein an axial thickness of the rim is greater than an axial thickness of the leaf spring.

6. The assembly of claim 4, wherein an axial thickness of the rim is equal to or less than an axial height of the standoff.

7. The assembly of claim 4, wherein an axial height of the standoff is equal to or greater than an axial thickness of the leaf spring.

8. The assembly of claim 4, wherein a radial length of the leaf spring is greater than an axial thickness of the leaf spring.

9. The assembly of claim 1, wherein each of the plurality of spring beams has a common lateral width.

10. The assembly of claim 1, wherein each of the plurality of spring beams has a common configuration.

11. The assembly of claim 1, wherein
a first of the plurality of spring beams has a first lateral width; and
a second of the plurality of spring beams has a second lateral width that is different than the first lateral width.

12. The assembly of claim 1, wherein
a first of the plurality of spring beams has a first configuration; and
a second of the plurality of spring beams has a second configuration that is different than the first configuration.

13. The assembly of claim 1, wherein the plurality of spring beams are equispaced circumferentially about the axis.

14. The assembly of claim 1, wherein the plurality of spring beams are asymmetrically spaced circumferentially about the axis.

15. The assembly of claim 1, wherein the housing axially contacts the case.

16. The assembly of claim 1, further comprising a gasket axially between and contacting the housing and the case.

17. The assembly of claim 1, further comprising:
a fluid conduit;
the component comprising a fluid intake that is fluidly coupled to the fluid conduit through the housing.

18. An assembly of an aircraft engine, comprising:
a case including an aperture, a case exterior side and a case interior side, the aperture extending axially along an axis through the case from the case exterior side to the case interior side, and the case interior side forming a peripheral boundary of an internal volume of the aircraft engine;
a fitting for a fluid conduit, the fitting mechanically fastened to the case, and a cavity formed by and extending axially between the fitting and the case; and
a fluid intake including a projection and a mount that is arranged in the cavity;
the projection projecting axially from the mount, through the aperture, and into the internal volume to an unsupported interior end of the fluid intake; and
the mount including a rim, a first spring beam and a second spring beam, the rim circumscribing the axis and axially engaging the case, the first spring beam and the second spring beam arranged circumferentially about the rim and axially spaced from the case, the first spring beam projecting radially out from the rim to a distal radial end of the first spring beam, the first spring beam comprising a first standoff located at the distal radial end of the first spring beam, the first standoff biased axially against the fitting, the second spring beam projecting radially out from the rim to a distal radial end of the second spring beam, the second spring beam comprising a second standoff located at the distal radial end of the second spring beam, and the second standoff biased axially against the fitting.

19. An apparatus for an aircraft engine, comprising:
an air intake including a projection, a mount, an air passage and an air inlet;
the projection projecting axially along an axis out from an interior side of the mount to a distal end of the air intake;
the mount including a rim, a first cantilevered spring beam and a second cantilevered spring beam, the rim extending circumferentially around the air passage and forming the interior side of the mount, and the first cantilevered spring beam and the second cantilevered spring beam arranged circumferentially about the rim and axially spaced from the interior side of the mount;
the first cantilevered spring beam including a first leaf spring and a first standoff that is located at a distal radial end of the first cantilevered spring beam, the first leaf spring projecting radially out from the rim to the distal radial end of the first cantilevered spring beam, and the first standoff projecting axially out from the first leaf spring in an axial direction away from the distal end of the air intake to a distal axial end of the first standoff;
the second cantilevered spring beam including a second leaf spring and a second standoff that is located at a distal radial end of the second cantilevered spring beam, the second leaf spring projecting radially out from the rim to the distal radial end of the second cantilevered spring beam, and the second standoff projecting axially out from the second leaf spring in the axial direction away from the distal end of the air intake to a distal axial end of the second standoff;
the air passage projecting axially into the air intake through the mount and into the projection; and
the air inlet formed in a sidewall of the projection and fluidly coupling the air passage to an environment outside of the air intake.

* * * * *